United States Patent
Franitza et al.

(10) Patent No.: US 12,521,184 B2
(45) Date of Patent: Jan. 13, 2026

(54) PRINTED TRACKER FOR A SURGICAL NAVIGATION SYSTEM

(71) Applicant: Stryker European Operations Limited, Carrigtwohill (IE)

(72) Inventors: Florian Franitza, Ehrenkirchen (DE); Fadi Ghanam, Schallstadt (DE)

(73) Assignee: Stryker European Operations Limited, Carrigtwohill (IE)

( * ) Notice: Subject to any disclaimer, the term of this patent is extended or adjusted under 35 U.S.C. 154(b) by 982 days.

(21) Appl. No.: 17/689,382

(22) Filed: Mar. 8, 2022

(65) Prior Publication Data

US 2022/0280247 A1   Sep. 8, 2022

(30) Foreign Application Priority Data

Mar. 8, 2021  (EP) .................................... 21161300

(51) Int. Cl.
*A61B 34/20* (2016.01)
*A61B 90/00* (2016.01)

(52) U.S. Cl.
CPC .............. *A61B 34/20* (2016.02); *A61B 90/39* (2016.02); *A61B 2034/2051* (2016.02); *A61B 2090/397* (2016.02); *A61B 2090/3991* (2016.02)

(58) Field of Classification Search
CPC ................................ A61B 90/39; A61B 34/20
USPC ........................................................... 606/1
See application file for complete search history.

(56) References Cited

U.S. PATENT DOCUMENTS

| | | | |
|---|---|---|---|
| 6,412,491 B1 | 7/2002 | Rusin | |
| 6,529,543 B1* | 3/2003 | Anderson | A61B 18/203 606/17 |
| 10,335,239 B2 | 7/2019 | Plassky et al. | |
| 2003/0161442 A1 | 8/2003 | Zeiss | |
| 2006/0212044 A1 | 9/2006 | Bova et al. | |
| 2010/0137712 A1 | 6/2010 | Krag et al. | |
| 2012/0143050 A1* | 6/2012 | Heigl | A61B 90/39 29/17.3 |
| 2014/0126767 A1 | 5/2014 | Daon et al. | |
| 2017/0086941 A1 | 3/2017 | Marti et al. | |

FOREIGN PATENT DOCUMENTS

| | | |
|---|---|---|
| EP | 2470102 B1 | 7/2016 |
| EP | 3424459 A1 | 1/2019 |
| EP | 3076892 B1 | 10/2019 |
| FR | 2998471 A3 | 5/2014 |
| GB | 2570758 A | 8/2019 |

(Continued)

OTHER PUBLICATIONS

English language abstract and machine-assisted English translation for FR 2 998 471 A3 extracted from espacenet.com database on Mar. 9, 2022, 8 pages.

*Primary Examiner* — Nadia A Mahmood
(74) *Attorney, Agent, or Firm* — Howard & Howard Attorneys PLLC

(57) ABSTRACT

A tracker for a surgical navigation system and a method for manufacturing the tracker are presented. The tracker comprises a layer stack that comprises a substrate with at least one reflective surface configured to reflect electromagnetic radiation. The layer stack further comprises a printed absorbent layer configured to absorb electromagnetic radiation, wherein the printed absorbent layer covers less than the entire reflective surface.

20 Claims, 8 Drawing Sheets

(56) References Cited

FOREIGN PATENT DOCUMENTS

| | | | |
|---|---|---|---|
| WO | 9938449 | A1 | 8/1999 |
| WO | 2011023232 | A1 | 3/2011 |
| WO | 2014032171 | A1 | 3/2014 |
| WO | 2014159350 | A1 | 10/2014 |

\* cited by examiner

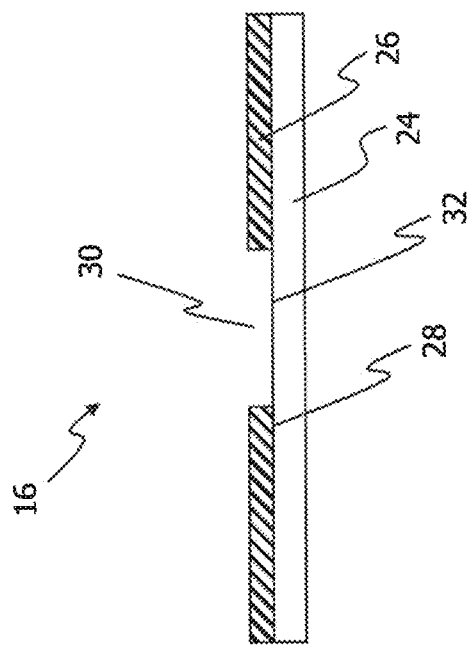
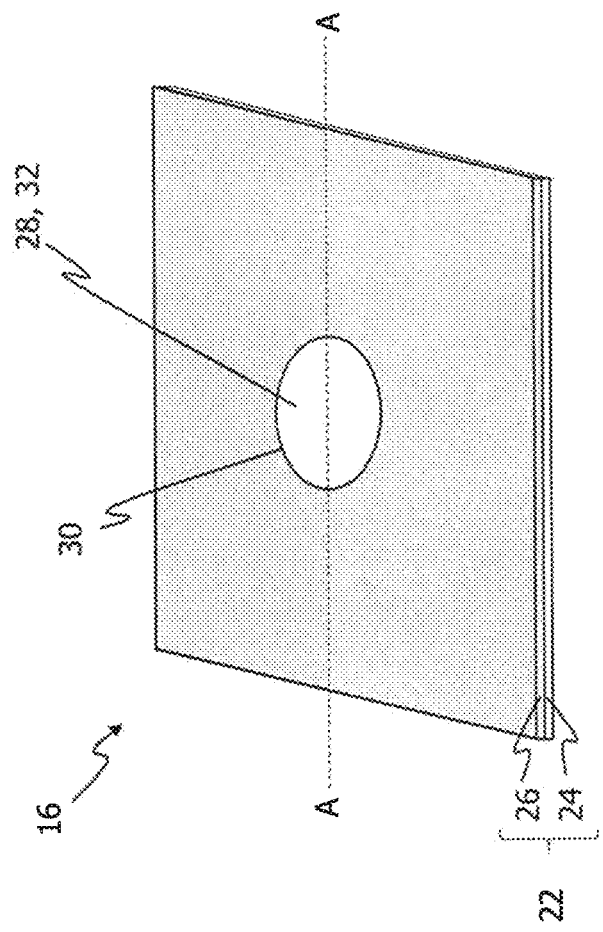
Fig. 2B
Fig. 2A

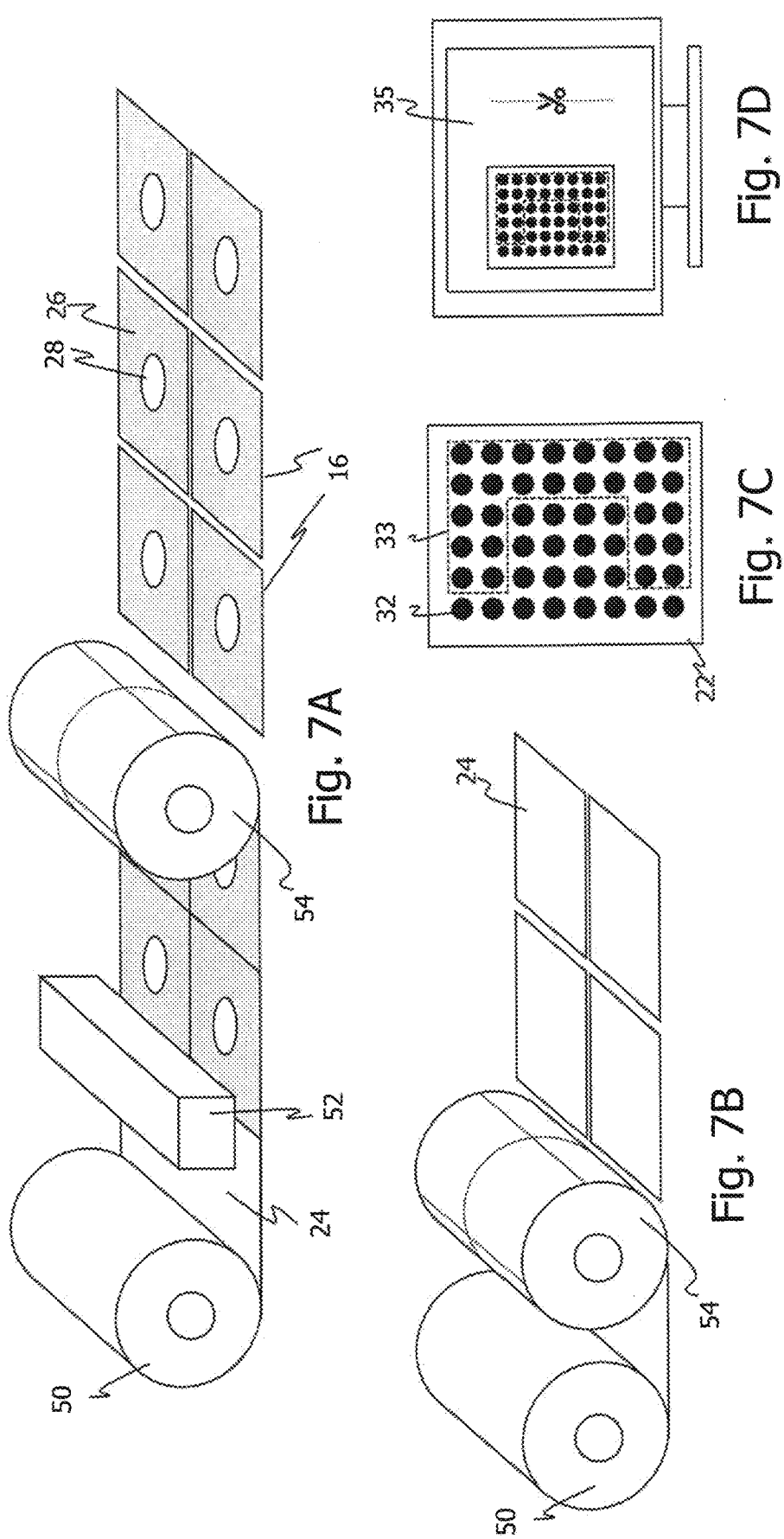

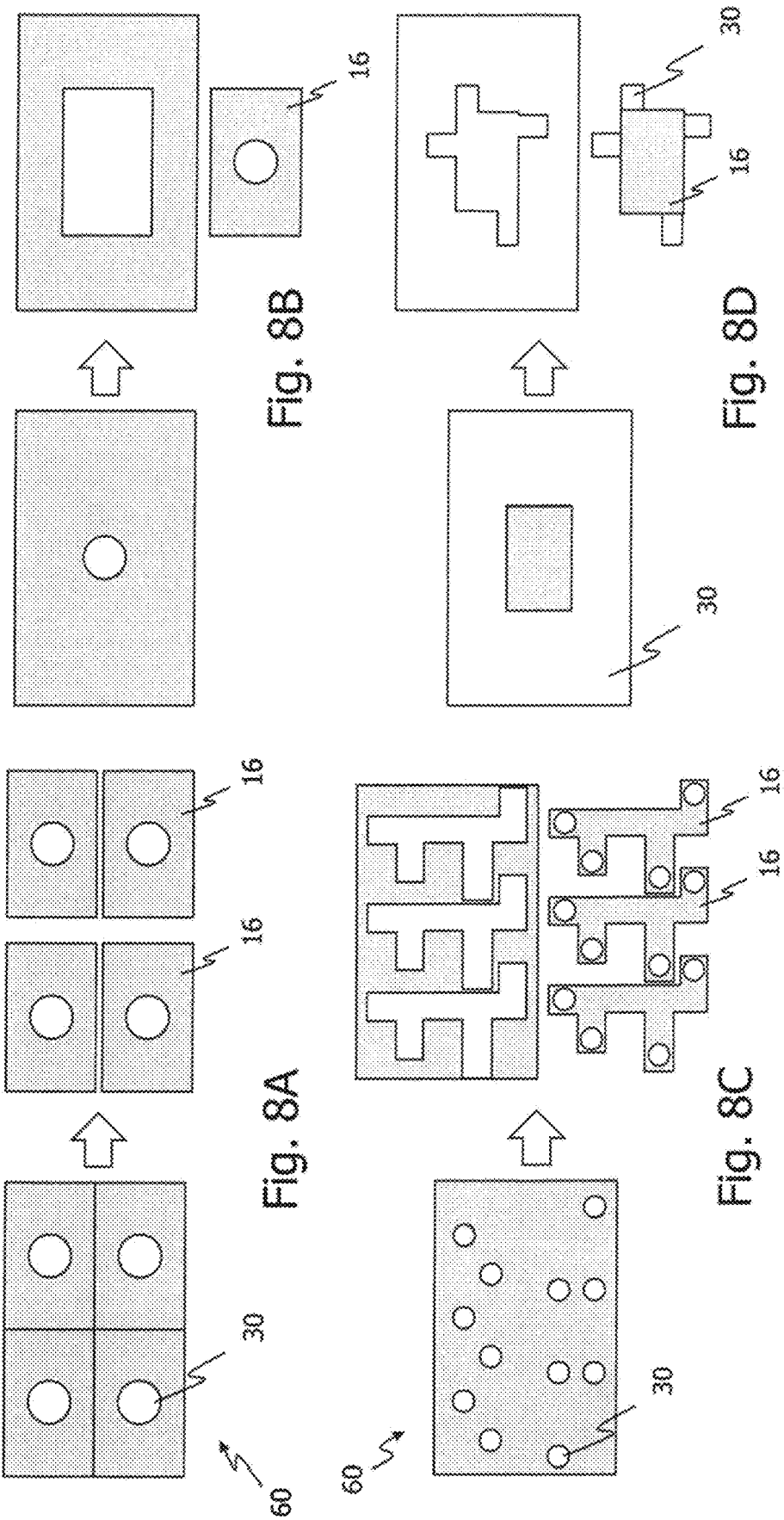

PRINTED TRACKER FOR A SURGICAL NAVIGATION SYSTEM

PRIORITY CLAIM

This application claims priority under 35 U.S.C. § 119 to European Patent Application No. 21161300.5, filed Mar. 8, 2021, the entire contents of which are hereby incorporated by reference.

TECHNICAL FIELD

The present disclosure generally relates to object tracking, for example in the context of surgical navigation. In particular, a tracker, a tracker system, a surgical navigation system, and a method of manufacturing the tracker are presented.

BACKGROUND

Surgical navigation systems are configured to a track surgical object such as a surgical instrument or a patient. To this end, one or more trackers are attached to the object that is to be tracked.

A commonly used passive tracking technique involves at least one tracker with a reflective surface configured to reflect electromagnetic radiation as well as an optical sensor capable of detecting the electromagnetic radiation reflected by the reflective surface. Based on the detected electromagnetic radiation, information on one or both of a position and an orientation of the tracker and, thus, the tracked object can be determined. An exemplary version of a known passive tracker comprises a carrier supporting a plurality of spheres that each has a reflective surface.

When used during surgery, such a tracker is required to meet surgical hygiene standards in order to prevent contamination of a surgical site. To this end, a reusable tracker may be used that is disinfected before each use. Alternatively, a disposable tracker may be provided that can be discarded after having been used. For example, EP 2 470 102 A teaches a foil-based disposable device for optical tracking.

Complex passive trackers, such as trackers supporting a plurality of reflective spheres, have many building parts, which makes them expensive to manufacture and unsuitable for one-time use. Less complex passive trackers do exist, both as disposable and re-usable items, but those often still consist of a number of different parts, which complicates manufacturing and does not permit an easy adaptation to different use cases.

SUMMARY

There is a need for a technique that solves one or more of the aforementioned, or other, problems.

According to a first aspect, a tracker for a surgical navigation system is provided. The tracker comprises a layer stack that comprises a substrate with at least one reflective surface configured to reflect electromagnetic radiation. The tracker further comprises a printed absorbent layer configured to absorb electromagnetic radiation, wherein the absorbent layer covers less than the entire reflective surface.

The reflective surface may be a planar or non-planar surface. The substrate may be a rigid or non-rigid material. The substrate may itself comprise a plurality of layers or materials. The substrate may have a face, and the reflective surface may fully or partially extend over that face. The electromagnetic radiation may comprise at least one of infrared light, visible light, ultraviolet light, and X-rays.

The absorbent layer may directly be printed on the reflective surface or on any further layer arranged between the reflective surface and the absorbent layer. The absorbent layer may comprise at least one material configured to absorb electromagnetic radiation. The at least one material may be printable as a fluid or powder. The at least one material may be selected from the group comprising: an ink, a toner material, paint, and aerosol paint.

The reflective surface may comprise at least one of a light reflective material, a light reflecting pigment, a microstructure configured to positively interfere light, and a light retroreflector. The reflective surface may have a metallic (e.g., mirror-reflective) appearance. The reflective layer may be formed by a reflective material that has been deposited on the substrate (e.g., using vapour deposition or any other deposition techniques).

The absorbent layer and the reflective surface may jointly define a reflective pattern. The reflective pattern may extend parallel to a face of the substrate. The reflective pattern may be planar pattern. The reflective pattern may be defined by at least one portion of the reflective surface that is not covered by the absorbent layer.

The reflective pattern may have an asymmetrical shape (e.g., in its extension parallel to a face of the substrate). The asymmetrical shape may have no rotational symmetry, such that there is no rotation of the reflective pattern with an angle smaller than 360° that results in an identical overlay with the reflective pattern before rotation. Additionally, or as an alternative, the asymmetrical shape may have no mirror symmetry with regard to any mirroring axis.

The reflective pattern may at least partly be defined by a one or more openings, where the absorbent layer does not cover the reflective surface. The reflective pattern may comprise a plurality of openings, such as two, three, four, five, or more openings. The plurality of openings may be arranged asymmetrically. The one or more openings may be provided in the absorbent layer (e.g., as one or more regions entirely surrounded or partially delimited by the absorbent layer). The reflective pattern may additionally be defined by a three-dimensional shape of the reflective surface.

The tracker may comprise an attachment interface for attaching the tracker to a patient or to surgical equipment (e.g., a surgical instrument). The attachment interface may comprise at least one of an adhesive, a clamp, a screw, a magnet, and a strap. The layer stack may be attached to the attachment interface by at least one of an adhesive, a clamp, a screw, a magnet, and a strap.

The layer stack may comprise an adhesive layer, wherein the substrate is arranged between the adhesive layer and the absorbent layer. The adhesive layer may be arranged on a surface of the substrate that is facing away from the absorbent layer. Alternatively, an intermediate layer may be arranged between the adhesive layer and the substrate. The adhesive layer may comprise at least one of a disposed adhesive material, and a double sided adhesive tape. The adhesive layer, such as the double sides adhesive tape, may comprise a peel-off label configured to be peeled off an adhesive of the adhesive layer. The attachment interface may comprise the adhesive layer.

The layer stack may comprise a protective layer that is arranged between the absorbent layer and the substrate. The protective layer may be transparent for electromagnetic radiation that is to be reflected by the reflective surface. The protective layer may be configured to be printed on. The absorbent layer may thus be printed on the protective layer.

The protective layer may be arranged over (e.g., directly on) the reflective surface of the substrate to protect the reflective layer. The protective layer may cover the entire reflective surface.

Alternatively or additionally, the layer stack may comprise a cover layer that is arranged on a surface of the absorbent layer (and, optionally, surfaces of the reflective surface and/or protective layer not covered by the absorbent layer) that faces away from the reflective surface.

The at least one reflective surface may be configured to reflect infrared light. Additionally or alternatively, the absorbent layer may be configured to absorb infrared light. A reflectance for infrared light of the reflective surface may be larger than a reflectance for infrared light of the absorbent layer. An absorbance of infrared light of the absorbent layer may be larger than an absorbance of infrared light of the reflective surface.

The substrate may consist of or comprise a foil. In some variants, the foil comprises the at least one reflective surface (e.g., a reflective material deposited on a flexible base layer).

The tracker may comprise a rigid carrier. The substrate may be attached to the carrier. The rigid carrier may comprise at least one of plastic, metal, and cardboard. The rigid carrier may be attached to or be a part of the attachment interface.

According to a second aspect, a tracker system is provided. The tracker system comprises a plurality of trackers as described herein, wherein the plurality of trackers share a common substrate. The plurality of trackers may further share at least one of the absorbent layer, the protective layer, the adhesive layer, and the cover layer. The plurality of tracker may be separable from each other. The absorbent layer of each tracker of the tracker system may have at least three openings, where the absorbent layer does not cover the reflective surface. The at least three openings of each tracker of the tracker system may be arranged in a dedicated arrangement. The arrangements of at least two tracker may be identical.

According to a third aspect, a surgical navigation system is provided. The surgical navigation system comprises a tracker as described herein, an optical sensor configured to detect electromagnetic radiation reflected by the reflective surface of the tracker not covered by the printed layer, and to generate image data based on detected electromagnetic radiation, and a processor configured to determine positional information of the tracker based on the image data of the optical sensor.

The positional information may comprise at least one of a position and an orientation of the tracker. The surgical navigation system may comprise a plurality of trackers as described herein. The processor may be configured to determine positional information of at least two of the plurality of trackers. The processor may be configured to determine a geometric relationship between the at least two trackers.

According to a fourth aspect, a method of manufacturing a tracker for a surgical navigation system is provided. The method comprises the steps of providing a substrate with at least one reflective surface configured to reflect electromagnetic radiation, and printing an absorbent layer configured to absorb electromagnetic radiation over the substrate in such a way that the absorbent layer covers less than the entire reflective surface.

The absorbent layer may be printed in a pattern that is determined based on at least one of a surgery setup, a surgery plan, and tracker design rules.

The surgery setup may define at least one of a viewing field of a tracking camera, a position and/or orientation of a patient or a body part of the patient, and a position and/or orientation of a surgeon. The pattern may be dimensioned to scale with the viewing angle, or a size of the patient. The pattern may be printed to fit onto a surface of the patient covered by the field of view and not blocked by the surgeon.

The surgery plan may define at least one of an area of interest of the patient, a surgical procedure, and a trajectory of a surgical instrument. The pattern may be printed to fit onto a surface of a body part that includes the area of interest. The pattern may be printed to fit onto a surface of the patient that is not covered by the trajectory. The surface of the patient may be covered by the trajectory if a projection of the trajectory perpendicular the patient surface or along the field of view coincides with said surface of the patient.

The tracker design rules may define at least one marker where the absorbent layer has an opening that does not cover the reflective surface. The tracker design rules may define at least one of a size and a shape of the at least one marker. The tracker design rules may define a minimum distance between markers. The minimum distance between markers may depend on a distance of the tracker to the tracking camera (e.g., the minimum marker distance may increase with increasing distance to the tracking camera, and vice versa). Additionally, or in the alternative, the minimum distance between markers may depend on a distance of the tracker to the anatomy that is to be tracked (e.g., the minimum marker distance may decrease with decreasing distance to the anatomy to be tracked, and vice versa).

The method may further comprise separating at least one tracker from a layer stack comprising the substrate and the absorbent layer (and, e.g., from another tracker co-located with the tracker on the substrate, or from a remainder of the substrate). The layer stack may further comprise at least one of the protective layer, the adhesive layer, and the cover layer. The separating may comprise cutting the layer stack into at least two pieces to separate the at least on tracker. The at least two pieces may each form a tracker. Alternatively, at least one of the pieces forms a leftover piece that does not form a tracker.

The layer stack may be trimmed by a user (e.g., using scissors or perforations) in order to obtain a tracker with a custom-shape. The custom-shape may be patient-specific or surgery-specific. The method may comprise providing trimming instructions for the user. The trimming instructions may comprise trimming markings printed on the layer stack that indicate where the layer stack is to be trimmed.

Alternatively or additionally, the trimming instructions may be provided on a display, e.g., in form of an image of the layer stack with trimming markings or an animation of how to trim the layer stack. The trimming instructions may be determined based on at least one of a surgery setup, a surgery plan, and tracker design rules as described herein.

The separation may result in an asymmetrical shape of at least one of (i) the at least one tracker and (ii) a reflective pattern jointly defined by the absorbent layer and extending parallel to the substrate. The reflective pattern may be defined by at least one portion of the reflective surface that is not covered by the absorbent layer.

The method may further comprise arranging a protective layer over the substrate prior to printing, wherein the protective layer is arranged between the printed absorbent layer and the substrate. The method may comprise printing the absorbent layer directly onto a surface of the protective layer that faces away from the substrate. The method may comprise arranging the protective layer directly onto the substrate. The method may comprise attaching the protective layer to the substrate with an adhesive.

The method may comprise providing an adhesive layer such that the substrate is located between the adhesive layer and the absorbent layer. The adhesive layer may be provided on a surface of the substrate that faces away from the absorbent layer. The adhesive layer may be formed by a double sided adhesive tape or may be applied by printing or using a brush.

BRIEF DESCRIPTION OF THE DRAWINGS

Further details, advantages and aspects of the present disclosure will become apparent from the following embodiments taken in conjunction with the drawings, wherein:

FIG. 2A schematically shows a perspective view of a first embodiment of the tracker;

FIG. 2B schematically shows a cross-section of the tracker depicted in FIG. 2A through a line A-A;

FIG. 7A schematically shows an assembly for providing a substrate, printing a absorbent layer, and separating trackers;

FIG. 7B schematically shows a manufacturing assembly for providing a substrate and separating the substrate into sheets for consecutive printing;

FIG. 7C shows a printed layer stack with markers and trimming instructions in the form of trimming markings printed on the layer stack;

FIG. 7D shows a display displaying trimming instructions;

FIG. 8A shows a top view of a tracker system comprising a sheet of a layer stack, wherein four trackers are separated by cutting the sheet into four pieces;

FIG. 8B shows a top view of a sheet of a layer stack, wherein one tracker is separated by cutting the sheet of the layer stack into two pieces;

FIG. 8C shows a top view of a tracker system comprising a sheet of a layer stack, wherein a plurality of trackers are separated by cutting out three trackers; and FIG. 8D shows a top view of a sheet of a layer stack, wherein a tracker is separated by cutting a tracker out of the layer stack.

DETAILED DESCRIPTION

Figure 1:
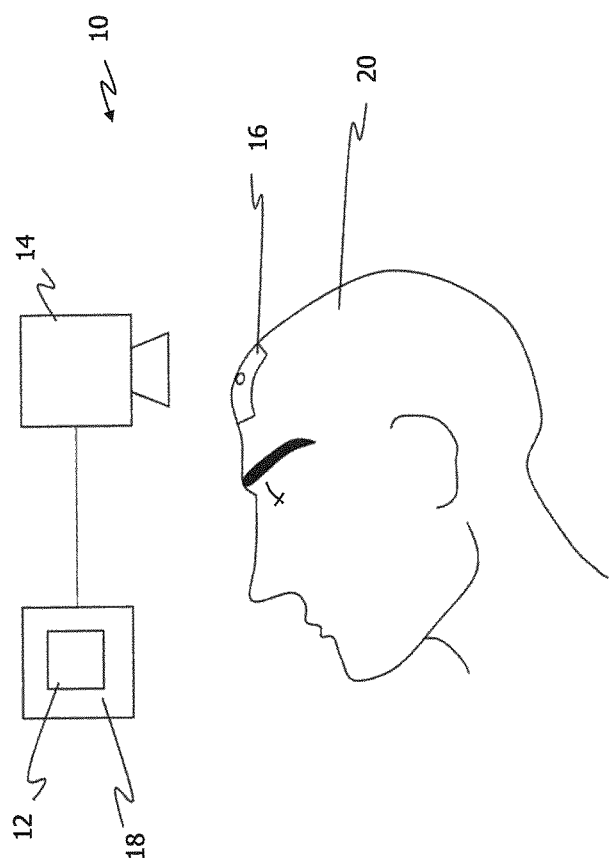
FIG. 1 schematically shows a surgical navigation system comprising a processor, an optical sensor, and a tracker.

The tracker embodiments described herein may be used for any tracking technology involving reflection of electromagnetic radiation, such as motion capture technology and tracking of virtual reality headsets. In the following, the tracker is described in the context of a surgical navigation system. The same reference numerals are used to denote the same or similar features.

FIG. 1 schematically shows an embodiment of a surgical navigation system 10 in a surgical scenario. The system 10 comprises a processor 12, an optical sensor 14, and a passive tracker 16. The system 10 may further comprise a source of electromagnetic radiation (not shown) to be reflected by the passive tracker 16.

The processor 12 is provided by a local computer system 18. Alternatively, the processor 12 may be provided by a remote server or cloud computing resources.

The optical sensor 14 is configured to generate image data based on detected electromagnetic radiation. The optical sensor 14 may be or may comprise a camera, such as a stereo camera comprising two such optical sensors 14 (e.g., in the form of Charge Coupled Devices, CCDs). The camera may be co-located with the source of electromagnetic radiation in a single housing. The optical sensor 14 is configured to detect at least one of visible light and infrared light. Alternatively, the optical sensor 14 may be configured to detect at least one of ultraviolet light and X-rays.

The processor 12 is programmed to determine positional information of the tracker 16 based on the image data of the optical sensor 14. The positional information may comprise at least one of a position and an orientation of the tracker 16.

The tracker 16 is attached to a surgical object 20. The surgical object 20 depicted in FIG. 1 is patient. Alternatively, the surgical object 20 may be a surgical instrument, surgical personnel, or any frame of reference (e.g., surgery table or a frame attached to the patient). It will be appreciated that one or more further, possibly different trackers 16 can be provided in the surgical scenario of FIG. 1. It will further be appreciated that each tracker 16 can be a disposable item or configured for multiple uses.

FIGS. 2A and 2B respectively shows a perspective and cross-sectional view of a first embodiment of the tracker 16. The tracker 16 comprises a layer stack 22 that, in turn, comprises a substrate 24 and a printed absorbent layer 26. The layer stack 22 thus defines a sandwich structure.

The substrate 24 comprises a sheet material of a rectangular shape. The sheet may have any other shape, such as a square, a circle, an oval, or any polygon. The substrate 24 may be formed of a material such as a polymer, a foamed polymer, paper, cardboard, rubber, and metal. The substrate 24 may be rigid or flexible. The substrate 24 may be elastically or plastically deformable. In some variants, the substrate 24 is a flexible foil.

In case of a rigid implementation, the substrate 24 may be planar, as depicted in FIG. 2A, or may be pre-shaped, for example to conform to a patient anatomy. In one variant, the sheet material may have a pre-bent shape, allowing the substrate 24 to be snugly placed on a nose, a forehead or other body part of a patient.

The substrate 24 has at least one reflective surface 28 configured to reflect electromagnetic radiation. As an example, the substrate 24 may be a reflective foil. The reflective foil may comprise a flexible base material with a reflective coating defining the reflective surface 28. Examples for a reflective foil are 3M™ Scotchlite™ High Gain Reflective Sheeting 7610 and 3M™ Scotchlite™ Reflective Material 8850 manufactured by 3M™.

The substrate 24 depicted in FIG. 2A has a single reflective surface 28 across an entire extension of a face of the substrate 24. Alternatively, only a portion of the face of the substrate 24 may be covered by the reflective surface 28. The substrate 24 depicted in FIG. 2A has a single reflective surface 28. Alternatively, the substrate 24 may have a plurality of reflective surfaces 28 that are spaced apart from each other.

The reflective surface 28 may have been created in different ways, for example by vapour deposition (e.g., of a metallic material). Alternatively, the reflective surface 28 may have been obtained by painting or polishing a (e.g., metallic) base material of the substrate 24.

The substrate 24 depicted in FIG. 2A is a single planar piece, wherein the reflective surface 28 is provided on a face of the single piece. Alternatively, the substrate 24 may comprise a frame or plate holding a reflective layer that comprises the at least one reflective surface 28.

The reflective surface 28 is configured to reflect electromagnetic radiation that may comprise at least one of infrared light, visible light, and ultraviolet light. For example, the reflective surface 28 may be configured to reflect visible light and infrared light, or it may be configured to predominantly reflect infrared light. For example, in the case of a reflective surface 28 that reflects (at least) infrared light, the reflective surface 28 may comprise materials that reflect infrared light, such as at least one of aluminium, silver, and infrared reflecting pigments. Additionally or alternatively, the reflective surface 28 may have microstructures for reflection of infrared light, such as structures that result in positive interference of infrared light or retroreflectors that reflect infrared light emitted from an optional source of infrared light towards the optical sensor 14.

The printed absorbent layer 26 is configured to absorb electromagnetic radiation at least in the spectrum reflected by the reflective surface 28. As shown in FIGS. 2A and 2B, the absorbent layer 26 covers less than the entire reflective surface 28. In this manner, the absorbent layer 26 and the reflective surface 28 jointly define a reflective pattern that extends parallel to the substrate 24. The reflective pattern comprises one or more portions of the reflective surface 28 that are not covered by the absorbent layer 26.

The printed absorbent layer 26 has a larger absorbance for electromagnetic radiation of a particular wavelength spectrum than the reflective surface 28. Put another way, the reflective surface 28 has a larger reflectance than the absorbent layer 26 in that wavelength spectrum. As a result, a portion of the reflective surface 28 that is covered by the absorbent layer 26 reflects less electromagnetic radiation than a portion of the reflective surface 28 that is not covered by the absorbent layer 26. The difference in reflectance can be detected by the optical sensor 14, which allows identifying the reflective pattern by a larger amount of electromagnetic radiation being reflected thereby (compared to electromagnetic radiation predominantly absorbed, but possibly also partially reflected by the absorbent layer 26).

The reflectance of the absorbent layer 26 and the reflectance of the reflective surface 28 differ for at least one wavelength spectrum, such as visible or infrared light (IR). The optical sensor 14 is selected to be sensitive for such a wavelength spectrum and, thus, is capable of detecting the reflective pattern defined by the absorbent layer 26 that partially covers the reflective surface 28.

FIG. 2B schematically shows a cross-section of the tracker 16 through a line A-A as depicted in FIG. 2A. It is noted that layers in cross-sections as depicted herein are drawn with overly large and similar sheet thicknesses for the sake of clarity. The sheet thicknesses may generally differ significantly, and each sheet may in fact comprise two or more separate material layers.

The absorbent layer 26 is printed over the substrate 24 in such a way that the absorbent layer 26 covers less than the entire reflective surface 28. As such, the absorbent layer 26 has at least one opening 30, where the reflective surface 28 is not covered by the absorbent layer 26. In the region of the opening 30, the reflective surface 28 defines a reflective pattern defining a marker 32 (in FIGS. 2A and 2B: a circular marker). As described above, the marker 32 is identifiable on the basis of a difference of the reflectance of the reflective surface 28 and the reflectance of the absorbent layer 26.

In the example depicted in FIG. 2B, the absorbent layer 26 is printed directly onto the substrate 24. As a result, the absorbent layer 26 is in direct contact with the substrate 24. Alternatively, additional layers may be arranged between the substrate 24 and the absorbent layer 26. Moreover, the substrate 24 could in other variants be realized as a three-dimensional (e.g., 3D printed) body.

Figures 3A, 3B, 3C, 3D:
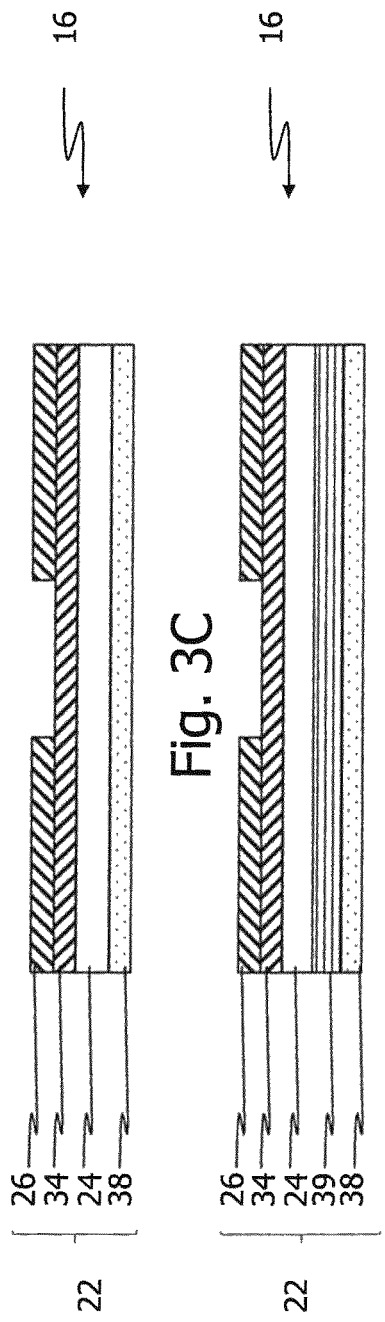
FIG. 3A schematically shows a cross-section of a second embodiment of the tracker.
FIG. 3B schematically shows a cross-section of a third embodiment of the tracker.
FIG. 3C schematically shows a cross-section of a fourth embodiment of the tracker.
FIG. 3D schematically shows a cross section of a fifth embodiment of the tracker.

FIG. 3A schematically shows a cross-section of a second embodiment of the tracker 16. The second embodiment essentially differs from the first embodiment in that the layer stack 22 further comprises a protective layer 34 that is arranged between, and adjacent to, the absorbent layer 26 and the substrate 24. The protective layer 34 is intended to protect the reflective surface 28 (e.g., from scratches, which may negatively affect its reflectance), while being transparent for the electromagnetic radiation that is to be reflected by the reflective surface 28. The protective layer 34 may be realized as a film, foil or coating. The protective layer 34 may be configured printable (e.g., by a corresponding surface treatment). Alternatively, or additionally, the protective layer 34 may be water repellent. As a result, liquids that may be occur during surgery, such as blood and disinfectant are less likely to remain on top of the tracker 16. The protective layer 34 may comprise, for example, 3M™ 9984 Diagnostic Microfluidic Surfactant Free Hydrophilic Film manufactured by 3M™.

FIG. 3B schematically shows a cross-section of a third embodiment of the tracker 16. The third embodiment essentially differs from the second embodiment in that the layer stack 22 further comprises a cover layer 36, wherein the absorbent layer 26 and the optional protective layer 34 are arranged between the cover layer 36 and the substrate 24. The cover layer 36 serves as a protection for the absorbent layer 26. The cover layer 36 may be made of a polymeric material. The cover layer 36 may cover the absorbent layer 26 and not cover at least a part of the substrate 24. Therefore, the cover layer 36 influences less the reflectivity of the reflective surface 28. Alternatively, the cover layer 36 may cover both the absorbent layer 26 and the substrate 24. As a result, more layers are protected by the cover layer 36.

FIG. 3C schematically shows a cross-section of a fourth embodiment of the tracker 16. The fourth embodiment essentially differs from the second embodiment in that the layer stack 22 further comprises an adhesive layer 38, so that the substrate 24 is arranged between the adhesive layer 38 and the absorbent layer 26. The adhesive layer 38 may comprise a layer of adhesive or a double sided adhesive tape. The adhesive layer 38 may further comprise a peel-off label (not shown) configured to be peeled off an adhesive of the adhesive layer 38. The protective layer 34 again is optional.

The adhesive layer 38 forms (or may be part of) an attachment interface for attaching the tracker 16 to a surgical object such as to a patient or to surgical equipment. Such a tracker 16, in particular if of a flexible nature, can therefore be directly attached to the patient 20 as, for example, depicted in FIG. 1.

FIG. 3D schematically shows a cross section of a fifth embodiment of the tracker 16. The fifth embodiment of the tracker 16 comprises a rigid carrier 39 (made, e.g., of a polymeric material). The carrier 39 is attached to the substrate 24, e.g., by an adhesive. The carrier 39 depicted in FIG. 3D is arranged between the substrate 24 and the adhesive layer 38. Alternatively, the adhesive layer 38 may be arranged between the substrate 24 and the carrier 39. The carrier 39 depicted in FIG. 3D is dimensioned to be flush with the substrate 24. Alternatively, the carrier 39 may be dimensioned to be wider or shorter than the substrate 24, and it may also have a non-planar configuration. The carrier 39 may be manufactured using an additive manufacturing technique. As an example, the carrier 39 may be 3D printed.

Figure 4B:
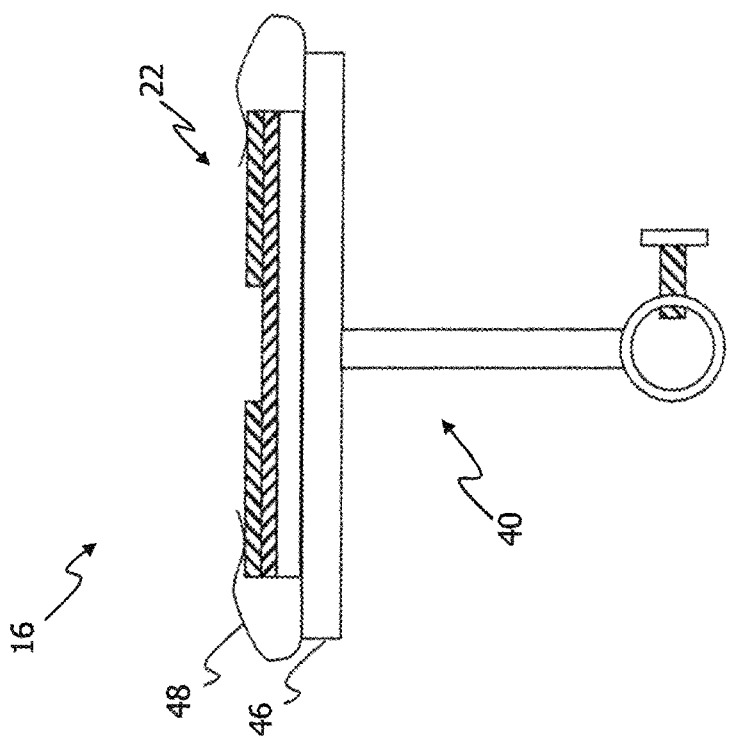
FIG. 4B schematically shows a cross-section of a seventh embodiment of the tracker.
Figure 4A:
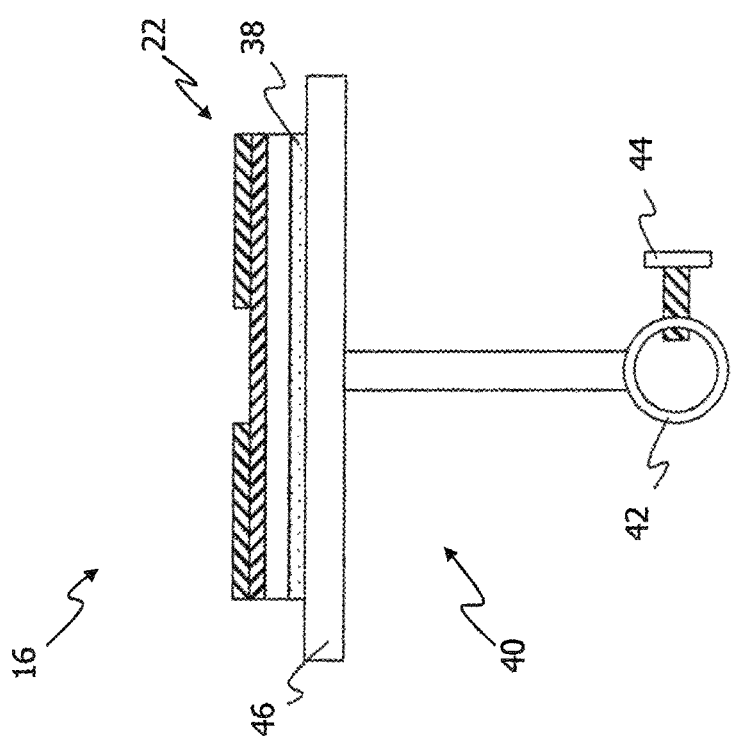
FIG. 4A schematically shows a cross-section of a sixth embodiment of the tracker.

FIG. 4A schematically shows a cross-section of a sixth embodiment of the tracker 16. The sixth embodiment of the tracker 16 comprises an attachment interface 40 for attaching the tracker 16 to a surgical equipment such as a surgical instrument or a frame attached to the patient. The exemplary attachment interface 40 shown in FIG. 4A comprises a ring 42 for receiving the surgical equipment with a tightening screw 44 (only illustrated schematically) for firmly attaching the ring 42 around the surgical equipment. Alternatively, any other form of attachment mechanism such as a screw, magnet, clamp, or suction cup can be used.

The attachment interface 40 comprises a support plate 46 that is configured to support the layer stack 22 (that may, for example, be any of the stacks of FIGS. 2B and 3A to 3D). The layer stack 22 is attached to the support plate 46 by the adhesive of the adhesive layer 38.

The attachment interface 40 may comprise alternative members for attaching the layer stack 22 to the support plate 46. FIG. 4B schematically shows a cross-section of a seventh embodiment of the tracker 16. The attachment interface 40 comprises at least one clamp 48 configured to engage the layer stack 22. Alternatively or additionally, the tracker attachment interface 40 may comprise other attachment mechanisms, such as at least one of a screw, a threaded opening, and a magnet. The attachment interface 40 may be configured to be disinfected for reuse. The attachment interface 40 may comprise or consist of materials that can be cleaned by a disinfectant. The attachment interface 40 may be configured to withstand heat sterilization in an autoclave.

In the following, examples of reflective patterns are described that vary, for example, in numbers and shapes of openings 30 in the absorbent layer 26 and the shape of the layer stack 22 and/or substrate 24. The layer stack 22 may, for example, be one of the stacks 22 of FIGS. 2B and 3A to 3D, or a different stack.

Figure 5B:
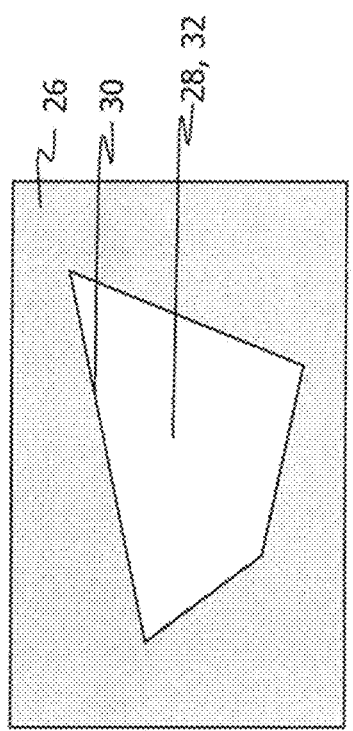
FIG. 5B shows a top view of an eighth embodiment of a tracker with an absorbent layer that defines a reflective pattern with an opening that has an asymmetrical shape.
Figure 5D:
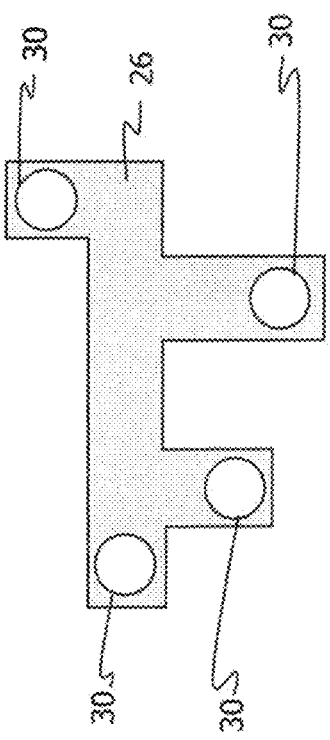
FIG. 5D shows a top view of a tenth embodiment of a tracker with a layer stack that is trimmed down to strips that respectively extend to each of a plurality of openings.
Figure 5A:
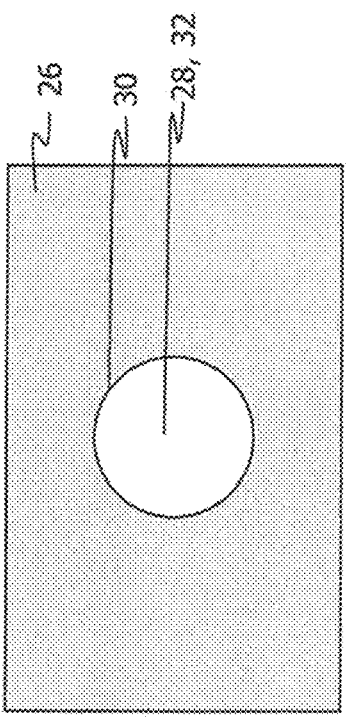
FIG. 5A shows a top view of the first embodiment of the tracker.

FIG. 5A shows a top view of tracker 16. The tracker 16 has an absorbent layer 26 with one opening 30 that is circularly shaped. The portion of the underlying reflective surface 28 that is not covered by the absorbent layer 26 defines the reflective pattern in form of a single marker 32, which is also circularly shaped. Therefore, the marker 32 depicted in FIG. 5A has a mirror and rotational symmetry. Such a marker can be used for tracking a surgical object with limited degrees of freedom (e.g., one or two degrees of freedom). A surgical object can still be tracked in more degrees of freedom by attaching two or more such "one marker" trackers 16 (e.g., three, four or five trackers 16) to the surgical object in a way that the resulting reflective pattern of the plurality of trackers 16 has an asymmetric shape.

FIG. 5B shows a top view of an another embodiment of a tracker 16 with an absorbent layer 26 that has a reflective pattern with an opening 30 that has an asymmetrical shape. In particular, the opening 30 has no rotational symmetry, i.e., there is no rotation with an angle smaller than 360° that results in an identical overlay, and no mirror symmetry. It should be noted that a marker 32 with a mirror symmetry and/or a rotational symmetry (e.g., a rectangular shape that has a rotational symmetry of 180° or a square shape that has a rotational symmetry of) 90° can also be used for tracking a position and orientation of the tracker 16, but the orientation may only be unambiguously tracked for rotations smaller than the rotational symmetry.

Figure 5C:
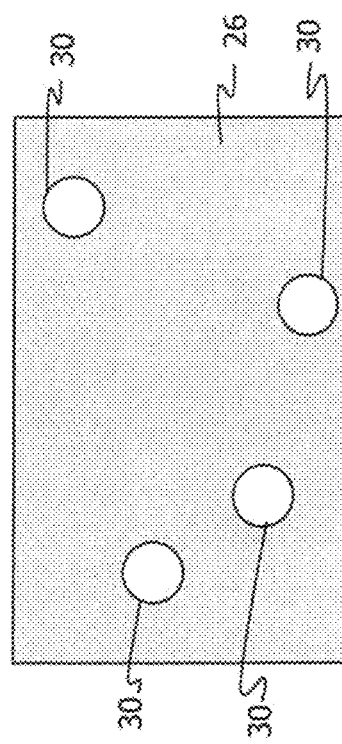
FIG. 5C shows a top view of a ninth embodiment of a tracker with an absorbent layer that defines a reflective pattern with four openings.

FIG. 5C shows a top view of a still further embodiment of a tracker 16 with an absorbent layer 26 that has a reflective pattern with four openings 30. Alternatively, the reflective pattern may have two, three, five, six, or more openings 30. The four openings 30 are placed in an arrangement that has no mirror symmetry and no rotational symmetry. Alternatively, the openings 30 may be placed in an arrangement that has a mirror and/or rotational symmetry. A reflective pattern with a plurality of openings 30 may be more easily resolved by an optical sensor 14 with a limited spatial resolution.

FIG. 5D shows a top view of another embodiment of a tracker 16 with a layer stack 22 that is trimmed down to strips, or legs, that respectively extend to each of a plurality of openings 30. In other words, the openings 30 are located at or near an end of each strip. The tracker 16 has a compact size and can be realized with a small weight. Furthermore, the layer stack 22 has an asymmetrical shape, such as shown in FIG. 5C.

Figure 6:
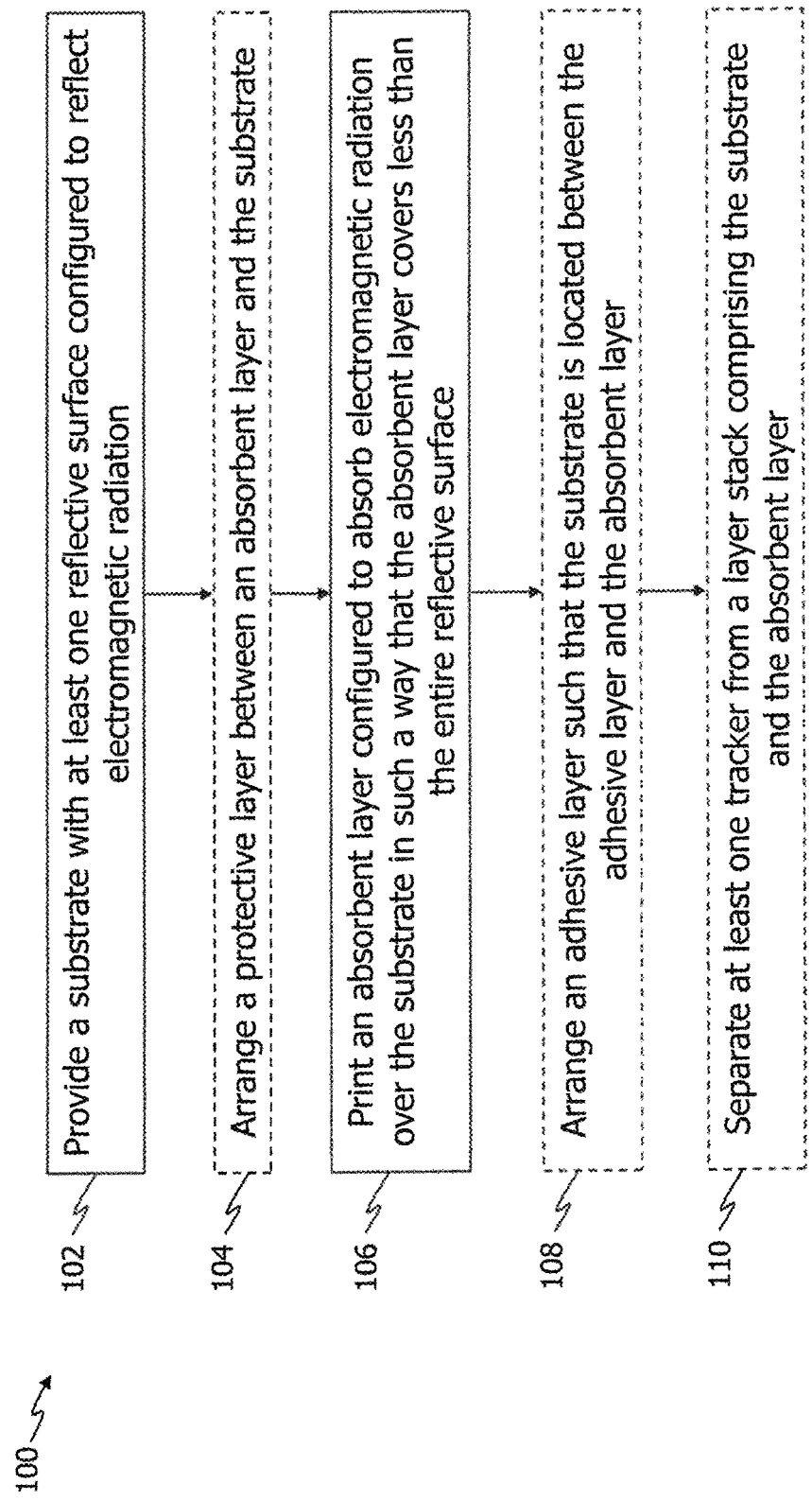
FIG. 6 shows a flow diagram of a method for manufacturing a tracker as described herein.

FIG. 6 shows a flow diagram of a method 100 for manufacturing a tracker 16 as described herein.

The method comprises, in step 102, providing a substrate 24 with at least one reflective surface 28 configured to reflect electromagnetic radiation. The substrate 24 may be provided in form of a single sheet, a stack of single sheets, a supply roll 50 of rolled up sheet (as depicted in FIG. 7A), or as a three dimensional (e.g., 3D printed) body. In a sheet implementation, the single sheet or stack of single sheets may be of a standard letter size compatible with a standard printer (e.g., ISO 216 sizes such as DIN-A 4 or paper sizes defined by the American National Standards Institute such as ANSI letter). When printed with a dedicated printer ink (using a standard ink jet printer) or dedicated toner material (using a standard laser printer), a user can print a tracker 16 with a printer that is compatible with such sheet sizes at the hospital.

As described above, the substrate 24 may comprise at least one of a polymer, a foamed polymer, paper, cardboard, rubber, and metal. The substrate 24 may be provided in, or cut into, such a compatible sheet size, as depicted in FIG. 7B, and provided to the user for subsequent printing.

As explained above, the reflective surface 28 of the substrate 24 comprises at least one material that is configured to reflect electromagnetic radiation in a specific light spectrum, such as infrared light, visible light, and ultraviolet light. For example, in the case of a reflective surface 28 that reflects infrared light, the reflective surface 28 may comprise a material that reflects infrared light, such as at least one of aluminium, silver, and infrared reflecting pigments.

The method 100 may further comprise, as an optional step 104, arranging a protective layer 34 on the substrate 24 to cover the reflective surface 28. The protective layer 34 may be attached to the substrate 24 (or any other layer adjacent to the protective layer 34) with an adhesive. Step 104 may still be made at the manufacturing site of the (e.g., sheet material forming the) substrate 24. The protective layer 34 may be provided to protect the reflective surface 28 and will be transmissive for electromagnetic radiation of the wavelength spectrum reflected by the reflective surface 28. At the same time, the protective layer 34, or any layer formed thereon, may be configured to reliably retain any printing thereon (e.g., by a surface treatment).

The method further comprises a step 106 of printing the absorbent layer 26 that is configured to absorb electromagnetic radiation over the substrate 24 in such a way that the absorbent layer 26 covers less than the entire reflective surface 28. The absorbent layer 26 may be printed directly onto the reflective surface 28 or on any layer provided thereon, such as the protective layer 34. Printing step 106 is performed by a printing apparatus 52 as depicted in FIG. 7A. The step of printing may comprise large scale printing processes such as offset printing or rotogravure printing. Alternatively or additionally, the step of printing may comprise small scale printing processes such as ink jet printing and laser printing. In the case of a non-planar substrate 24 (e.g., a substrate that accommodates a facial feature or a feature of a surgical instrument), the printing step 106 may comprise pad printing.

The absorbent layer 26 may comprise or consist of at least one of ink, toner material, paint, and aerosol paint. The absorbent layer 26 (or at least one material included in the absorbent layer 26) may be configured to absorb electromagnetic radiation of a specific spectrum, such as at least one of infrared light, visible light, and ultraviolet light. For example, in order to absorb infrared light, the absorbent layer 26 may comprise at least one of infrared absorbing metals such as gold and copper, or infrared absorbing pigments. The absorbent layer 26 may comprise ink that absorbs predominantly infrared light, for example, with a wavelength between 850 nm and 900 nm, such as IR absorbing screen ink of the SPECTRE™ 300 Series manufactured by Epolin.

The printing step 106 may comprise selectively transferring the absorbent layer 26 in such a way that the absorbent layer 26 is not transferred over portions of the reflective surface 28 that are supposed to form openings 30 (e.g., by transferring a pattern from a print cylinder to the substrate 24 or by controlling an ink jet printer to print a dedicated reflective pattern). Alternatively or additionally, a printing mask may be arranged between the printing apparatus 52 and the substrate 24 during printing. The mask may be movably or fixedly attached to the printing apparatus 52. Alternatively or additionally, a mask may be temporarily arranged or attached onto the substrate 24 (or other layers already arranged on top of the substrate 24) and removed after printing.

The printing step 106 may be performed by the user in the hospital. To this end, the substrate 24 (optionally with other layers provided thereon as described herein, such as at least one of the protective layer 34, the cover layer 36, and the adhesive layer 38) and material for printing the absorbent layer 26 (e.g., in form of a ink cartridge with infrared absorbent ink or a toner cartridge with an infrared absorbent toner powder) is provided to the user, who can print the tracker 16 using a standard printer that is compatible with the substrate 24 and the material for printing the absorbent layer 26.

The method 100 may also comprise, as an optional step 108, providing an adhesive layer 38 such that the substrate 24 is located between the adhesive layer 38 and the absorbent layer 26. Providing the adhesive layer 38 may comprise spraying, applying, or spreading an adhesive onto a surface of the substrate 24 facing away from the absorbent layer 26 (or onto a surface of any additional layer arranged between the substrate 24 and the adhesive layer 38). Alternatively or additionally, providing the adhesive layer 38 may comprise attaching a double sided tape or film onto a surface of the substrate 24 facing away from the absorbent layer 26 (or a surface of any additional layer arranged between the substrate 24 and the adhesive layer 38). The method may further comprise applying onto the adhesive layer 38 a peel-off label configured to be peeled off the adhesive layer 38.

The method 100 may comprise, as a further optional step 110, separating at least one tracker 16 from a layer stack 22 comprising the substrate 24 and the absorbent layer 26 (and optionally at least one of the aforementioned layers, such as the protective layer 34, the cover layer 36, and the adhesive layer 38). The separating step 110 may comprise cutting the layer stack 22 into at least two pieces to separate the at least one tracker 16.

The separating step 110 may be performed by a dice cutting apparatus 54 as depicted in FIGS. 7A, B. Alternatively, the layer stack 22 may be trimmed by a user (e.g., using scissors) in order to obtain a tracker 16 with a custom-made shape (e.g., in a patient-specific or surgery-specific manner). To this end, the method may comprise providing trimming instructions for the user. The trimming instructions may at least in part be determined based on at least one of a surgery setup, a surgery plan, and tracker design rules. Examples in this regard have been presented above.

FIG. 7C shows a printed layer stack 22 with markers 32 and trimming instructions in form of trimming markings 33 printed on the layer stack 22 that indicate where the layer stack is to be trimmed. Trimming the layer stack 22 depicted in FIG. 7C results in a tracker 16 with a U-shape that can be attached to a patient in a way that the tracker 16 surrounds a surgery site, but leaves a gap (e.g., on the skin) that can be arranged to define an access for surgery. As a result, the risk of the surgeon blocking a view to the tracker 16 when interacting with the surgery site is reduced.

FIG. 7D shows a display 35 displaying trimming instructions 35. The trimming instructions depicted in FIG. 7D comprise an image of the layer stack 22 with trimming markings.

FIG. 8A shows a top view of a tracker system 60 comprising a sheet of a layer stack 22 as generally described above, wherein four trackers 16 are separated by cutting the sheet into four pieces each forming one of the four trackers 16. Alternatively, any other number of trackers 16 may be cut from the sheet of the layer stack 22.

FIG. 8B shows a top view of a sheet of a layer stack 22, wherein one tracker 16 is separated by cutting the sheet of the layer stack 22 into two pieces, wherein one central piece forms a tracker 16 and the remaining framing piece is a leftover sheet that does not form part of the tracker 16. The leftover sheet may be discarded.

FIG. 8C shows a top view of a tracker system 60 comprising a sheet of a layer stack 22, wherein a plurality of trackers 16 are separated by cutting three trackers 16 out of the layer stack 22 leaving a piece of leftover sheet. Each tracker 16 comprises an arrangement of four openings, wherein the arrangement is identical for every tracker 16. Alternatively, each tracker 16 may comprise a different amount of openings, such as two, four, five, six, or more. Furthermore, each tracker 16 may have a different arrangement of openings. Still further, only some of the trackers 16 (such as two or three) of the trackers 16 may have an identical arrangement of openings.

The tracker systems 60 depicted in FIGS. 8A, C comprise a plurality of trackers 16 as described herein, wherein the plurality of trackers 16 share a common substrate 24. Additionally, the plurality of trackers 16 may share at least one of the absorbent layer 26, the protective layer 34, the adhesive layer 38, and the cover layer 36. Instead of cutting the at least one tracker 16 out of the tracker system 60, perforations may be cut around the at least one tracker 16. Such perforations allows a user to tear trackers 16 individually out of the tracker system 60.

FIG. 8D shows a top view of a sheet of a layer stack 22, wherein a tracker 16 is separated by cutting a tracker 16 out of the layer stack 22 leaving a piece of leftover sheet. The initial sheet of the layer stack 22 comprises an absorbent layer 26 and a reflective surface 28 that define a reflective pattern in the shape of a rectangular frame. The reflective pattern has a rotational symmetry of 180°. However, the cutting results in a shape of the tracker 16, wherein the openings 30 are arranged in a reflective pattern that has no rotational symmetry. Consequently, the pattern of the openings 30 may have a shape with no rotational symmetry as a result of at least one of the step of printing and the step of separating.

The method may optionally comprise attaching the separated layer stack 22 to an attachment interface 40 as described above.

The tracker 16 as described herein can be manufactured by printing using inexpensive materials such as cardboard or plastic sheets. As a result, the tracker 16 generates little waste upon disposal, or may alternatively be recycled.

Since the tracker 16 can be printed, the tracker 16 can be easily mass produced. Alternatively, a user is able to print a tracker 16 with a customizable reflective pattern when provided with the substrate 24 and printing material, making the tracking procedure more flexible. The user may be provided a software containing a selection of predefined shapes for printing the absorbent layer 26. A surgeon being the user may thus configure the tracker 16 according to his or her needs in the operating room.

The features described in relation to the exemplary embodiments shown in the drawings can be readily combined to result in different embodiments. It is apparent, therefore, that the present disclosure may be varied in many ways. Such variations are not to be regarded as a departure from the invention as defined by the claims appended hereto.

The invention claimed is:

1. A tracker for a surgical navigation system, the tracker comprising a layer stack that comprises:
   a substrate with at least one reflective surface configured to reflect electromagnetic radiation; and
   a printed absorbent layer configured to absorb electromagnetic radiation, wherein the absorbent layer covers less than the entire reflective surface.

2. The tracker according to claim 1, wherein the absorbent layer comprises at least one material configured to absorb electromagnetic radiation, the at least one material being selected from the group comprising: an ink, a toner material, paint, and aerosol paint.

3. The tracker according to claim 1, wherein the absorbent layer and the reflective surface jointly define a reflective pattern.

4. The tracker according to claim 3, wherein the reflective pattern has an asymmetrical shape.

5. The tracker according to claim 3, wherein the reflective pattern is at least partly defined by one or more openings in the absorbent layer, where the absorbent layer does not cover the reflective surface.

6. The tracker according to claim 1, further comprising an attachment interface configured to attach the tracker to a patient or to a surgical equipment.

7. The tracker according to claim 6, wherein the attachment interface comprises an adhesive.

8. The tracker according to claim 1, wherein the layer stack comprises an adhesive layer, wherein the substrate is arranged between the adhesive layer and the absorbent layer.

9. The tracker according to claim 1, wherein the layer stack comprises a protective layer that is arranged between the absorbent layer and the substrate.

10. The tracker according to claim 1, wherein at least one reflective surface of the substrate is configured to reflect infrared light and/or the absorbent layer is configured to absorb infrared light.

11. The tracker according to claim 1, further comprising a rigid carrier, wherein the substrate is attached to the carrier.

12. A tracker system comprising a plurality of trackers, wherein each tracker comprises a layer that comprises:
   a substrate with at least one reflective surface configured to reflect electromagnetic radiation; and
   a printed absorbent layer configured to absorb electromagnetic radiation, wherein the absorbent layer covers less than the entire reflective surface,
   wherein the plurality of trackers share a common substrate.

13. A surgical navigation system comprising:
   a tracker comprising a layer stack that comprises:
   a substrate with at least one reflective surface configured to reflect electromagnetic radiation; and
   a printed absorbent layer configured to absorb electromagnetic radiation, wherein the absorbent layer covers less than the entire reflective surface;
   an optical sensor configured to detect electromagnetic radiation reflected by the reflective surface of the tracker not covered by the printed absorbent layer, and to generate image data based on the detected electromagnetic radiation; and
   a processor configured to determine positional information of the tracker based on the image data of the optical sensor.

14. A method of manufacturing a tracker for a surgical navigation system, the method comprising the steps of:
   providing a substrate with at least one reflective surface configured to reflect electromagnetic radiation; and
   printing an absorbent layer configured to absorb electromagnetic radiation on the substrate in such a way that the absorbent layer covers less than the entire reflective surface.

15. The method according to claim 14, further comprising separating at least one tracker from a layer stack comprising the substrate and the absorbent layer.

16. The method according to claim 15, further comprising providing trimming instructions for a user about how to trim the layer stack.

17. The method according to claim 15, further comprising cutting the layer stack into at least two pieces to separate the at least one tracker.

18. The method according to claim 15, wherein the separation results in an asymmetrical shape of at least one of (i) the at least one tracker and (ii) a reflective pattern jointly defined by the reflective surface and the absorbent layer.

19. The method according to claim 15, further comprising arranging a protective layer over the substrate prior to printing, wherein the protective layer is arranged between the substrate and the printed absorbent layer.

20. The method according to claim 15, further comprising providing an adhesive layer such that the substrate is located between the adhesive layer and the absorbent layer.

* * * * *